June 10, 1941.  G. A. TINNERMAN  2,244,975
FASTENING DEVICE
Filed April 24, 1939  2 Sheets-Sheet 1

INVENTOR.
BY GEORGE A. TINNERMAN
Bates, Goldrick, & Teare
ATTORNEYS

June 10, 1941.    G. A. TINNERMAN    2,244,975
FASTENING DEVICE
Filed April 24, 1939    2 Sheets-Sheet 2

INVENTOR.
GEORGE A. TINNERMAN
BY Bates, Golrick, &Teare
ATTORNEYS

Patented June 10, 1941

2,244,975

UNITED STATES PATENT OFFICE 2,244,975

FASTENING DEVICE

George A. Tinnerman, Rocky River, Ohio, assignor, by mesne assignments, to Tinnerman Products, Inc., Cleveland, Ohio, a corporation of Ohio Application April 24, 1939, Serial No. 269,726

8 Claims. (Cl. 85—5)

This invention relates to fastening devices, and particularly to those that are constructed of sheet metal, cold rolled metal and the like. The present application is a continuation in part of my copending application, Serial No. 213,219, filed June 11, 1938, and since issued as United States Patent No. 2,156,003, April 25, 1939.

The device of the present application is useful in many ways. For example, it may be utilized in holding two articles together through the medium of a projection that forms part of one of the articles, or may be useful in coacting with the thread of a bolt to secure two parts together. Other uses include a bearing in which an article, such as a shaft or stem, is slidably or rotatably positioned either with or without indexing means for retaining the slidable member in any selective position with relation to a support. The fastener may also be used in holding articles that are made of plastic materials, or die castings, and examples of such application comprise, nameplates, door pulls, bracket supports, or any other instance where the fastener is accessible from one side only of the device on which the article is intended to be used.

An object of the present invention is the provision of a fastening device which may be positioned upon one article merely by inserting it through an opening therein, and which will automatically effect a locking action therewith sufficient to retain it in place until it receives any article that is intended to be inserted thereinto.

An additional object is to provide a combination of article and fastening device by means of which the article is automatically locked in place upon the fastener by insertion thereto whereby an automatic locking connection is made merely by moving the parts into juxtaposed relationship.

Figure 1:
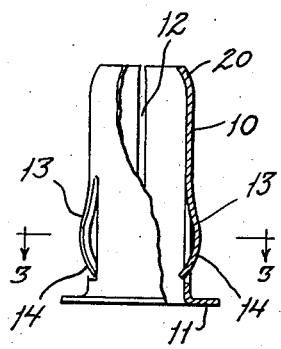
Figure 2:
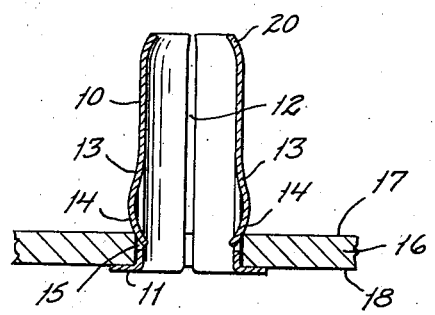
Figure 3:
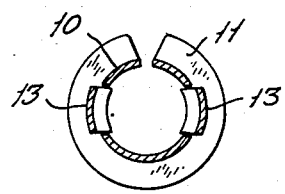
Figure 5:
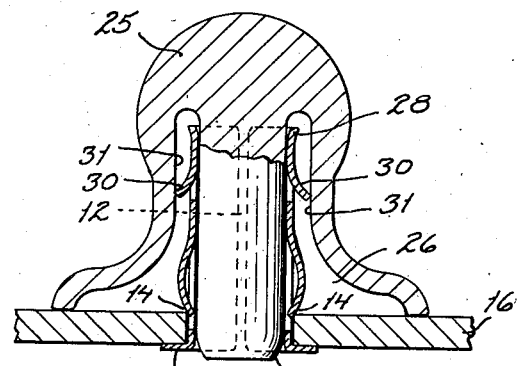
Figure 4:
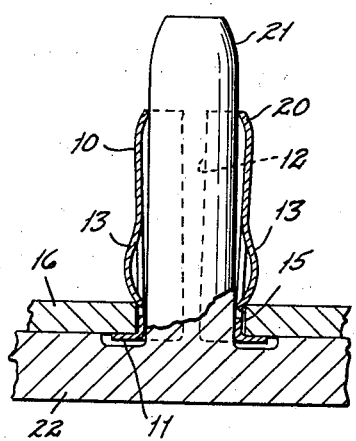
Figures 6, 7:
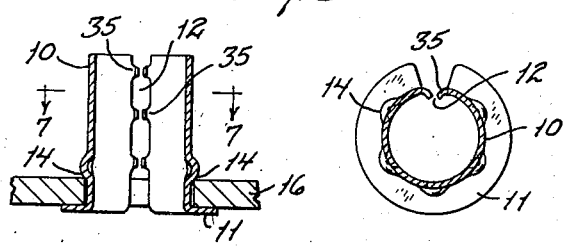
Figure 8:
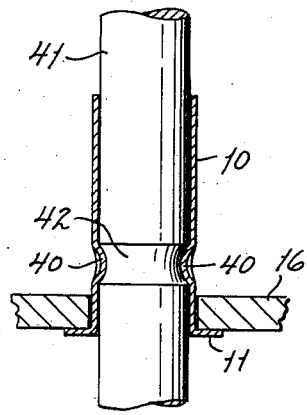
Figure 9:
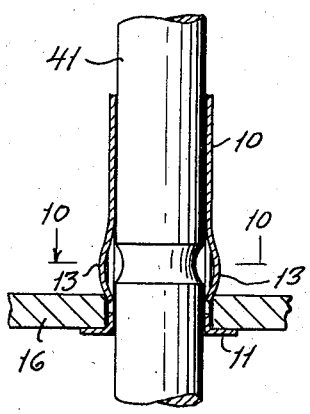
Figure 10:
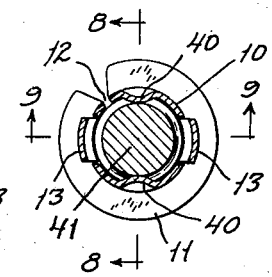
Figure 11:
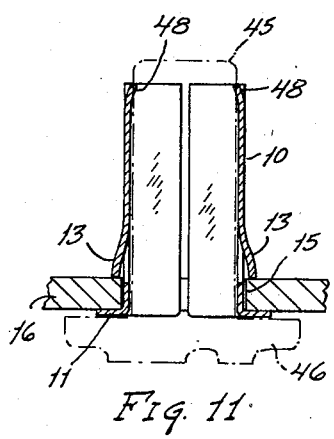
Figure 13:
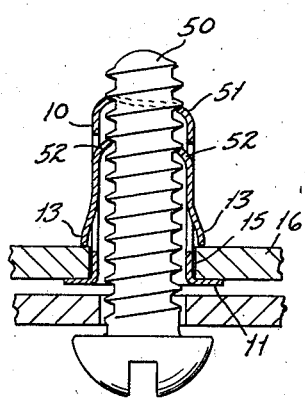
Figure 14:
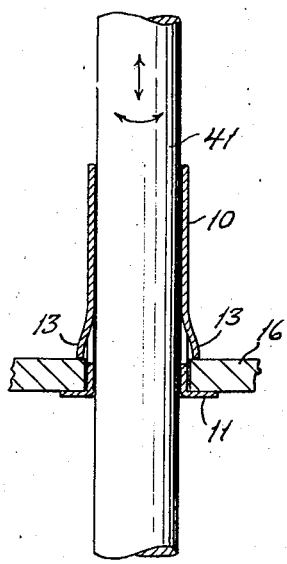
Figure 12:
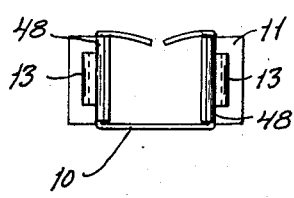

Referring now to the drawings; Fig. 1 is a view partly in section and partly in elevation, of a fastener embodying one form of the invention; Fig. 2 is a longitudinal section through the fastener shown in Fig. 1, and illustrates how it is extended through an opening in a part to be joined; Fig. 3 is a section taken on the line 3—3 in Fig. 1; Fig. 4 is a longitudinal section similar to that of Fig. 2, but illustrating an article having a portion thereof extending into the fastener and being held thereby; Fig. 5 is a longitudinal section through a modified form of construction showing the utility for holding an article, such as a porcelain knob, that may be utilized for retaining a shelf in place within a refrigerator; Fig. 6 is a section through a modified form of construction and illustrating the fastener in applied position upon one part; Fig. 7 is a section taken on the plane indicated by the line 7—7 in Fig. 6; Fig. 8 is a longitudinal section taken on the line 8—8 in Fig. 10 through a fastener which functions as a bearing for a member that is adapted to be moved axially therein, and to be supported thereby; Fig. 9 is a section taken on the line 9—9 in Fig. 10; Fig. 10 is a section taken on the line 10—10 in Fig. 9; Fig. 11 is a section through a modified form of fastener construction showing what might be termed a non-removable fastener; Fig. 12 is a top plan view of Fig. 11 when the fastener is unattached; Fig. 13 is a section through a non-removable fastener having a formation that adapts it for engaging the thread of a bolt and cooperating therewith to retain the bolt in applied position; Fig. 14 is a longitudinal section through a non-removable fastener which functions as a bearing to support a member which is intended to move axially therein.

The fastening devices illustrated are preferably formed from a substantially rectangular section of sheet metal, or strip stock of the desired width. The blank is suitably slit and deformed to make the desired yielding and holding formations and is then shaped to form a hollow body which may have a longitudinally extending slit that permits a slight expansion to accommodate an article that is inserted therethrough; and the degree of pressure that is intended to be exerted upon the article may be varied by proportioning the cross-sectional area of the hollow body to that of the article to be inserted therethrough; a tighter fit being chosen in those instances where relatively greater frictional contact between the fastener and associated article is desired.

Referring first to the fastener illustrated in Figs. 1-4 inclusive, the blank is formed to provide a hollow body 10 which has a flange 11 at one end thereof and which is illustrated as being in the form of a slitted tube wherein the slit 12 may extend the full length of the tube. The body is shown as having yieldable fingers 13 that are deformed therefrom to provide shoulders 14 which, as shown in Fig. 2, are adapted to engage each of the openings 15 adjacent the face 17 through which the fastener has been passed in such applied position. The flange 11 engages the face 18 and the spacing between the flange and the shoulders is so positioned as to effect a relatively snug fit between the fastener and the part 16.

To retain an article in close relationship to the part 16, I prefer to provide an article gripping portion adjacent the end opposite the flange, preferably by cupping the metal inwardly around the periphery of the end, as indicated at 20. The extent of the cupped portion is governed by the degree of friction desired between the fastener and the article such as a stud 21 that projects from the part 22. In the illustration of Fig. 4 the stud 21 is inserted into the fastener from the same side of the part 16 from which the fastener is inserted into the opening 15, and during the inserting operation, the stud spreads the fastener so as to press that portion adjacent the flange firmly into contact with the wall of the opening and also spreads the portion adjacent the end opposite the flange outwardly whereby the stud may be firmly gripped at more than one point by the fastener.

In the modification of Fig. 5, the fastener is inserted through the part 16 from one side thereof while the article to be attached thereto is positioned on the opposite side thereof. In this illustration, the attaching article comprises a bracket which may be in the form of a knob 25 and may be made of any desired material. As illustrated, it has a hollow interior 26 preferably in the form of a pocket, and a stud 27 which is adapted to enter the fastener from the end opposite the flange 11. To facilitate such insertion, the portion adjacent the end is flared as at 28, and the cross-sectional area of the stud and the body of the fastener is so proportioned that the fastener is sprung outwardly during the inserting operation whereby a frictional contact is maintained at the completion of an inserting operation. To increase the frictional contact, I have shown tongues or prongs 30 which are deformed from the body near the end 28 thereof and which may extend toward the flange 11 and in an outward direction sufficiently far to engage the wall 31 and to exert frictional pressure thereagainst so as yieldingly to resist movement of the knob away from the part 16. During the inserting operation, the fastener is prevented from being forced through the part 16 by engagement of the shoulders 14 with the edge of the opening in the part 16. The fastener of Fig. 5 has a slit 12 extending longitudinally thereof, as described in connection with the fastener of Figs. 1–4, inclusive, to assure cooperative resiliency in the assembly.

The fastener shown in Figs. 6 and 7 employs a modified form of means for retaining itself in article receiving position upon a support, and in this modified form, the parts which correspond to the fastener of Fig. 1 bear corresponding reference characters. The shoulders 14, however, are formed by one or more protuberances that are struck from the body at a predetermined distance from the flange to assure a relatively snug fit against the part 16. In this form, I may, if desired, utilize the article engaging portion 20 or 30 of Figs. 1 and 5 respectively, or I may provide prongs 35 which extend inwardly of the body adjacent the slit 12. The degree of pressure to be exerted against an article that is inserted through the fastener may vary considerably in proportion to the extent that the prongs 35 are bent inwardly with respect to the body.

The modification shown in Figs. 8 to 10 inclusive, permits the use of the fastener as a bearing for a shaft or rod that extends therethrough. Accordingly it may have a hollow body 10 which is substantially uniform in cross-sectional area throughout its length and may have a flange 11 and yieldable fingers 13 integral therewith for receiving a part 16 and holding itself in article receiving position thereon. Additionally, if desired, the body may have one or more inwardly extending protuberances 40 which are adapted to engage the shaft or rod 41 for the purpose of indexing it at a definite location with reference to the fastener. A suitable groove 42 extending peripherally on the rod may receive the protuberances 40 whenever the rod is moved with reference to the fastener, to the point where registration is made between a protuberance and the groove. In this form as in the previously described forms, the slit 12 may extend longitudinally of the fastener to provide resiliency in the assembly, and here again the degree of friction desired may be controlled by choosing a cross-sectional area of the fastener in accordance with that of the rod that is to be inserted therethrough.

The fasteners previously described have a hollow body that is substantially cylindrical in shape. In Figs. 11 and 12, however, I have shown a fastener the body 10 of which is non-circular, such as rectangular in cross-section. This shape produces a non-rotatable fastener which is highly advantageous. In holding a nameplate or other article in non-rotative position upon a support, as, for instance, in automotive assembly where the name of the vehicle appears on the side of the hood with individual letters and where it is important that each letter remain permanently in non-rotatable position. To this end, the part 16 has an opening 15 that is complementarily shaped to the cross-sectional form of the fastener body and likewise the stud 45 of the button or part 46 has a cross-sectional shape which is complementary to the cross-sectional shape of the fastener body. In the form of fastener if desired, the finger 13 may be extended outwardly and terminate near the extreme limit of the outermost position so as to provide sufficient space into which the part 16 may extend after the fastener has been passed through the opening 15. It is to be understood that during the inserting operation, the fingers 13 yield inwardly to permit passage through the opening 15 but as soon as the ends of the fingers clear the part 16 they spring outwardly to engage the side 17 and thereby prevent removal of the fastener merely by the exertion of pressure thereagainst in an endwise direction. This type of fastener may thus be termed a non-removable device. The fastener may also be arranged to engage frictionally, the stud 45 and for such purpose, I have illustrated inturned portions 48 that engage opposite walls of the stud 45 and that are yieldable to provide resiliency in the assembly. It is to be understood, however, that if desired, the fastener may be provided with fingers such as that shown in Fig. 1, or it may be shaped as shown in any of the drawings to suit the particular object that is affixed to the support.

The modification shown in Fig. 13 is intended for cooperation with the thread of a bolt or screw 50 and hence, the end of the body remote from the flange 11 s turned inwardly and shaped, as at 51, to form a helix which corresponds to that of the thread on a coacting bolt. Additional engagement with the bolt thread may be obtained by means of inwardly projecting fingers 52 which are adapted to engage a turn of the thread different from that engaged by the portions 51. Here again the body of the fastener may be shaped as shown in Fig. 12 to prevent rotation thereof during the turning of the bolt, and likewise the body may be made non-removable by utilizing fingers 13 that engage the part 16 at points remote from the wall of the opening 15 after the fastener has been passed therethrough. The fastener shown in this modification may or may not have the longitudinally extending slit depending upon the pressure that is required between the bolt and the fastener. Thus, for installations where only a light load is carried the use of a slit would hasten the assembly, but where a heavy load is to be carried the resistance against outward movement would have advantages that could be obtained by so forming the body that the edges along which the slit would normally be formed are brought into abutting relationship.

In Fig. 14, I have shown a fastener that is intended to provide a bearing for a rod or shaft either for axial movement within the fastener or for rotation with respect thereto. To accomplish this, I have shown the body 10 as being substantially cylindrical in shape and as having fingers 13 which are shaped similarly to those of Fig. 11 for engaging the side of a part 16 opposite to that engaged by the flange 11. The fingers, however, may, if desired be made as shown in Fig. 1, but in either case the arrangement is such that the fastener may be supported upon the part 16 for reception of the shaft or rod 41.

An advantage of a fastener made in accordance with the present invention is the fact that articles may be held in assembled relationship either by insertion from one or the other side of a support, depending upon the character of the device in which it is to be employed and that the parts may be frictionally held or locked in coacting position in a simple and expeditious manner.

The fastener illustrated in Fig. 5 is normally concealed from view and yet the article supported thereby is firmly held in operative position. Other modifications shown assure effective locking action between two parts to be joined without permitting rotation therebetween. This is highly advantageous for holding certain articles that should not be capable of rotation in assembled position. The fastener also lends itself to the reception and operation of a rod or shaft for axial movement or rotation and for indexing the rod to any desired position with reference to the fastener.

I claim:

1. A fastening device comprising a hollow flexible sheet metal body open at both ends and having spaced shoulders adjacent one end thereof for engaging in an aperture in a support and retaining itself in article receiving position thereon, at least one of said shoulders comprising a protuberance that is deformed from the body and extends outwardly thereof, said body being adapted to receive a stud expanding the same and urging said protuberance thereon to a position positively retaining said body in fastening position in said aperture.

2. A fastener comprising a sheet metal body having spaced inner walls adapted to receive a stud therebetween, said body being provided with a flange and a flexible finger extending longitudinally of said body, said finger defining a shoulder projecting outwardly of said body and a stud engaging portion extending inwardly into the space within said inner walls of the body, said body being receivable in an opening in a support with said flange and shoulder of said finger cooperating to engage opposite sides of said support to retain the fastener thereon in fastening position, said body receiving said stud in secured relation to said support in such fastening position.

3. A fastener comprising a hollow sheet metal body having spaced inner walls adapted to receive a stud therebetween, a flange adjacent one end of said body and means adjacent the other end for engaging said stud, a flexible finger extending longitudinally of said body, said finger defining a shoulder projecting outwardly of said body and a stud engaging portion extending inwardly into the space within said inner walls of the body, said body being receivable in an opening in a support with said flange and shoulder of said finger cooperating to engage opposite sides of said support to retain the fastener thereon in fastening position, said body receiving said stud in secured relation to said support in such fastening position.

4. A fastener comprising a sheet metal body having spaced inner walls adapted to receive a stud therebetween, a flange on said body, a flexible finger having a free end portion and extending longitudinally of said body, said finger defining a shoulder projecting outwardly of said body with the free end portion thereof extending inwardly into the space within said inner walls of the body, said body being receivable in an opening in a support with said flange and shoulder of said finger cooperating to engage opposite sides of said support to retain the fastener thereon in fastening position, said body receiving said stud in such fastening position and said free end portion of the finger defining means for engaging said stud in secured relation to said support.

5. A fastener comprising a hollow sheet metal body adapted to receive a stud, a flange adjacent one end of said body, inwardly bent means adjacent the other end for engaging said stud, a flexible finger extending longitudinally of said body, said finger defining a shoulder projecting outwardly of said body and having its free end portion extending inwardly of said body, said body being receivable in an opening in a support with said flange and the shoulder defined by said finger cooperating in engaging opposite sides of said support to retain the fastener thereon in fastening position, said body receiving said stud in secured relation to said support in such fastening position.

6. A fastener comprising a hollow sheet metal body adapted to receive a stud, a flange adjacent one end of said body, the other end being cupped inwardly for engaging said stud, a flexible finger extending longitudinally of said body, said finger defining a shoulder projecting outwardly of said body and having its free end portion extending inwardly of said body, said body being receivable in an opening in a support with said flange and the shoulder defined by said finger cooperating in engaging opposite sides of said support to retain the fastener thereon in fastening position, said body receiving said stud in secured relation to said support in such fastening position.

7. A fastener comprising a hollow sheet metal body adapted to receive a stud, a flange adjacent one end of said body, substantial tongues or the like projecting from said body for engaging a part outwardly thereof, a flexible finger extending longitudinally of said body, said finger defining a shoulder projecting outwardly of said body and having its free end portion extending inwardly of said body, said body being receivable in an opening in a support with said flange and the shoulder defined by said finger cooperating in engaging opposite sides of said support to retain the fastener thereon in fastening position, said body receiving said stud in secured relation to said support in such fastening position.

8. A fastener comprising a hollow sheet metal body adapted to receive a stud, a flange adjacent one end of said body, substantial protuberances or the like bent inwardly of said body for engaging said stud, a flexible finger extending longitudinally of said body, said finger defining a shoulder projecting outwardly of said body and having its free end portion extending inwardly of said body, said body being receivable in an opening in a support with said flange and the shoulder defined by said finger cooperating in engaging opposite sides of said support to retain the fastener thereon in fastening position, said body receiving said stud in secured relation to said support in such fastening position.

GEORGE A. TINNERMAN.